(12) United States Patent
Winterstein et al.

(10) Patent No.: US 10,912,153 B2
(45) Date of Patent: Feb. 2, 2021

(54) HEATING DEVICE FOR HEATING LIQUIDS IN A RESERVOIR, SUCH AS A TANK OR A CONTAINER OF A VEHICLE

(71) Applicant: I.G. BAUERHIN GMBH, Gruendau (DE)

(72) Inventors: Thomas Winterstein, Aschaffenburg (DE); Klaus Flittner, Johannesberg (DE)

(73) Assignee: I.G. Bauerhin GmbH, Gruendau (DE)

( * ) Notice: Subject to any disclaimer, the term of this patent is extended or adjusted under 35 U.S.C. 154(b) by 0 days.

(21) Appl. No.: 16/217,584

(22) Filed: Dec. 12, 2018

(65) Prior Publication Data
US 2019/0191490 A1 Jun. 20, 2019

(30) Foreign Application Priority Data
Dec. 18, 2017 (DE) .................... 20 2017 006 480 U

(51) Int. Cl.
*G01N 3/20* (2006.01)
*F01N 3/28* (2006.01)
(Continued)

(52) U.S. Cl.
CPC ........... *H05B 1/0297* (2013.01); *F01N 3/208* (2013.01); *F01N 3/2066* (2013.01);
(Continued)

(58) Field of Classification Search
CPC ............... F01N 3/2066; F01N 2610/02; F01N 2610/10; F01N 2610/2406;
(Continued)

(56) References Cited

U.S. PATENT DOCUMENTS 6,180,930 B1 * 1/2001 Wu ....................... F24H 3/0429
  219/530
2004/0104215 A1 * 6/2004 Starck ...................... H05B 3/14
  219/534

FOREIGN PATENT DOCUMENTS

DE 38 15 306 A1 11/1989
DE 102 58 257 A1 7/2003
(Continued)

*Primary Examiner* — Audrey K Bradley
(74) *Attorney, Agent, or Firm* — Robert W. Morris; Eckert Seamans Cherin & Mellott, LLC

(57) ABSTRACT

Systems, methods, and devices are disclosed. In an exemplary embodiment, a heating device for heating liquids in a reservoir, such as a tank or a container of a vehicle is disclosed. The heating device may have a housing which is resistant to the liquid to be heated and has a tubular outer casing closed at one end by a base part and at the other end by a cover part. The heating element may also include an insert inserted into the outer casing of the housing and at least one surface heating element arranged between the outer casing and the insert. Connecting conductors of the heating element may be routed out of the housing sealed, and at least one surface heating element may cover the inner surface of the outer casing, viewed in the circumferential direction of the outer casing, at least over a partial circumference, with which the outer casing may be in thermal contact, and the insert, or at least parts thereof, may be pretensioned and press the at least one surface heating element against the inner surface of the outer casing at least in partial regions.

23 Claims, 11 Drawing Sheets

Figure 1:
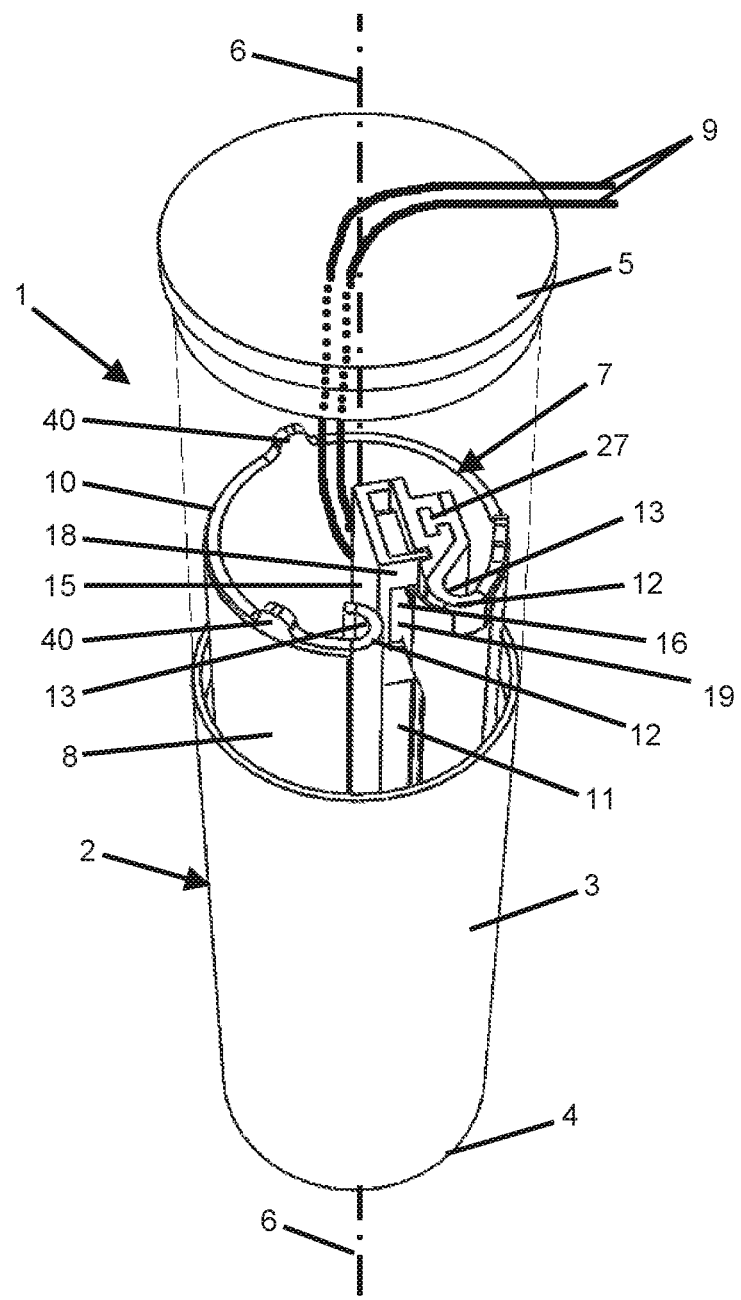

(51) Int. Cl.
  *H05B 1/02*   (2006.01)
  *H05B 3/00*   (2006.01)
  *H05B 3/54*   (2006.01)
  *H05B 3/82*   (2006.01)
  *F01N 3/20*   (2006.01)

(52) U.S. Cl.
  CPC ......... *F01N 3/2896* (2013.01); *H05B 3/0019* (2013.01); *H05B 3/54* (2013.01); *H05B 3/82* (2013.01); *F01N 2610/02* (2013.01); *F01N 2610/10* (2013.01); *F01N 2610/1406* (2013.01); *F01N 2610/1486* (2013.01); *H05B 2203/013* (2013.01); *H05B 2203/016* (2013.01); *H05B 2203/02* (2013.01); *H05B 2203/021* (2013.01)

(58) Field of Classification Search
  CPC ..... F01N 2610/1486; F01N 2610/1406; H05B 3/54; H05B 3/82; H05B 2203/013; H05B 2203/02; H05B 2203/021
  See application file for complete search history.

(56) References Cited

FOREIGN PATENT DOCUMENTS

DE   10 2005 025 724 A1   12/2006
DE   10 2016 111 258 A1   9/2017

\* cited by examiner

HEATING DEVICE FOR HEATING LIQUIDS IN A RESERVOIR, SUCH AS A TANK OR A CONTAINER OF A VEHICLE

The present invention relates to a heating device.

Such heating devices are used to heat liquids in a reservoir, in particular of a vehicle, such as a fuel tank or a water container for cooling water or windshield wiper water, in order to counteract freezing of the water or a change in the consistency of the liquid, such as diesel fuel, at low temperatures.

A particular application field is the heating of urea tanks in which urea is stored for mixing with diesel fuel to meet diesel exhaust emission standards. The urea solution used here is also known as AdBlue® (brand of the German Association of the Automotive Industry). In North America, such an additive is referred to as DEF (Diesel Exhaust Fluid).

The process is based on the injection of ammonia into the catalytic converters used in vehicles, which reduces nitrogen oxides. However, since ammonia not only causes a pungent odor but is also dangerous, urea is used which decomposes into ammonia. The AdBlue used is an aqueous solution with a 32.5% urea content and selectively converts the environmentally harmful nitrogen oxide contained in the exhaust gas into water and nitrogen without producing any unwanted by-products. The consumption of this additive is in the range of 2% to 8% of the fuel consumption, so that relatively large containers are required for the urea. This process is known as SCR (Selective Catalytic Reduction).

Since the aqueous urea solution freezes at −11° Celsius (12° Fahrenheit), heatable tanks are required.

A urea solution has very corrosive properties, which is the reason why the usual heating devices, which are installed in the tanks or containers for this purpose, have a housing that is resistant to the liquid to be heated and has a tubular outer casing with a rectangular, round or also oval cross-section. This outer casing is closed at one end by a base part and at the other end by a cover part. An insert with a heating element is inserted into this outer casing. Connecting conductors for the heating element are routed out of the housing, sealed.

DE 10 2016 111 258 A1 describes a heating cartridge with an outer protection tube and an inner sheath tube. A spring element is inserted in an intermediate space between protection tube and sheath tube, which is wave-shaped or meander-shaped when viewed in the cross-section of the heating cartridge. A ceramic PTC element is located at a distance inside the inner sheath tube.

DE 102 58 257 A1 relates to an electrical heating device for heating a liquid in a motor vehicle having a metallic housing immersed in the liquid within which a heating insert is located having one or more heating elements clamped in the metallic housing. The heating elements are plate- or disc-shaped, flat parts that are held on a frame.

DE 10 2005 025 724 A1 (corresponds to U.S. 20090100824 A1) relates to a urea supply system for an exhaust-gas purification catalyst and a heating insert suitable therefor. A connecting line connecting the urea tank to an exhaust gas purification catalytic converter is connected to a defrosting tank in which a fraction of the amount of urea sufficient to start the catalytic converter and storable in the urea tank is defrosted by means of the heating insert. The heating insert consists of a corrosion-resistant tube, a metal housing attached to the tube, and at least one heating element located inside the metal housing. The heating element, which can be plate-shaped, can be held in the metal housing by a mounting frame.

DE 38 15 306 A1 (corresponds to U.S. Pat. No. 4,942,289) describes a heating element that consists of a contact unit having at least one PTC element, contact plates resting on both sides of it and a housing that are pressed together. In a non-pressed state of the heating element, the contact plates are curved and rest with their convex side on the PTC elements. The housing consists of a dimensionally stable light metal and, when non-pressed, has a convex inner wall facing the contact arrangement with a finite radius of curvature greater than the radius of curvature of the contact plates. After pressing the housing and curved contact plates together, the contact plates are under elastic tension. After pressing, the curved contact plates and the inner wall of the housing are aligned flat and under tension.

The problem addressed by the present invention is that of creating a heating device with the features mentioned above, which has a simple structure, allows adaptation to the respective containers and shows high efficiency.

This problem is solved by a heating device for heating liquids in a reservoir with the features of claim 1. Advantageous embodiments of this heating device are specified in the dependent Claims.

The heating device according to the invention is characterized in that the at least one surface heating element covers the inner surface of the outer casing, viewed in the circumferential direction of the outer casing, at least over a partial circumference, in thermal contact with the outer casing and preferably resting flush against it. The insert, or at least parts thereof, is pretensioned and thereby presses the at least one surface heating element against the inner surface of the outer casing, at least in partial regions, and preferably flush.

Such an arrangement, although simple in design, achieves good heat transfer from the surface heating element to the tubular outer casing. It is essential here that the surface heating element is pressed on substantially flush by the insert, so that a positive connection and/or a frictional connection between the pressing surface of the insert, the surface heating element and the inner surface of the outer casing is achieved preferably in substantial regions.

This heating device, or even several of these heating devices, can be extended or combined to form larger heating units by bundling several of these heating devices side by side or by positioning and combining several of these heating devices one behind the other.

The surface heating element is preferably held along a slot of the insert which extends in the axial direction relative to the axis of the tubular outer casing. The heating element thus held at one end unwinds from the slot on an outer surface of the insert when viewed in the circumferential direction.

The surface heating element is preferably attached along the slot by at least one clamping part without the need for additional fasteners. Such a clamping part can be designed as a snap lock with intermeshing parts which, once locked, permanently hold the surface heating element to the insert.

The connecting conductors of the surface heating element are preferably routed into an inner area of the insert in the area of the slot in which the surface heating element is held. The clamping part, or the several clamping parts that are used to hold the surface heating element to the insert, can also be used to hold the connecting conductors to it. These clamping parts can also serve as strain relief for the connecting conductors and thus for the connection point between connecting conductor and heating element. For this purpose, at least one clamping part is provided with an opening as a feedthrough for the connecting conductors into the inner region of the insert.

The surface heating element preferably has at least one tab-shaped extension that holds the surface heating element to the insert in the area of the slot. This tab-shaped extension can also be used for a connection to the connecting conductors, so that the connecting conductors are routed into the inner region of the insert via the tab-shaped extension(s).

In addition, the connecting conductors on the tab-shaped extension can be covered with a potting compound.

To achieve the greatest possible heat transfer from the surface heating element to the inner surface of the outer casing, the at least one surface heating element should have a length in the circumferential direction of the outer casing such that the inner surface of the outer casing is completely covered, but no overlapping surfaces of the surface heating element arise. In this way, the entire circumference of the inner surface of the outer casing is covered by the at least one surface heating element.

The insert on which the surface heating element is held has, in a particularly preferred embodiment, a slotted tubular body which is pretensioned in a radial direction to expand its diameter. Such a slotted tubular body can also be referred to as a section of a spiral spring, on the outside of which the at least one surface heating element rests. This pretensioned section of the coil spring presses the at least one surface heating element flush against the inner surface of the outer casing. One end of the coil spring section can be held in the section of the slot on an inner part of the insert, while the other end can move freely in the circumferential direction. This means that the coil spring section, i.e. the outer surface of the insert viewed in radial direction, is clamped at only one end.

In this embodiment, in which the insert has a slotted tubular body as described above, preferably at least one longitudinal edge of the tubular body is rolled or inverted radially inwards along the slot, whereby the surface heating element can then be attached, for example, to the rolled-up longitudinal edge and unwinds around the rolled-up longitudinal edge to the outside of the tubular body. This ensures that the surface heating element is not bent in the area of its attached longitudinal edge and is therefore not damaged.

It is also to be regarded as a preferred measure to roll the two longitudinal edges of the tubular body radially inwards along the slot or to invert them. Such an arrangement can be used if a surface heating element is attached to each of these two edges which, starting from the slot, surround the insert in opposite directions.

Along the slot, the edges that define the slot, or the two rolled or inverted longitudinal edges, can be joined together such that, viewed in cross-section, a V-shaped or U-shaped groove is formed. The surface parts of the insert which form the groove can be dimensioned and tensioned such that the tubular body of the insert, through the V- or U-shaped groove, forms a tongue area which produces a radially outward pretension of the tubular body and thereby presses the surface heating element against the inner surface of the outer casing. The spring tension of the V- or U-shaped section is selected so that the opening width of the V- or U-shaped cross-section of the section increases, and the diameter of the tubular body also increases when the insert is not inserted into the outer casing.

A rail assigned to the insert can be used to attach at least one heating element to the insert or to arrange and connect several inserts one behind the other in the axial direction of the tubular housing. This rail has a profile in cross section with which a corresponding profile of the insert can be connected, preferably a profile located at one edge of the insert along the slot.

It is also provided that in an embodiment which is to be preferred in some applications, the insert, viewed in the cross-sectional direction of the outer casing, is divided into at least two, preferably at least three, partial bodies which are pressed apart from each other in the direction of the at least one surface heating element and thus in the radial direction by spring elements under pretension. For example, coil springs can be used that are inserted in corresponding blind holes in two adjacent surfaces of the partial bodies and thus push the partial bodies apart in the radial direction and thus in the direction of the surface heating element.

The preferred surface heating element is a PTC foil heating element, which can be very thin and can be easily adapted in size to the inner surface of the outer casing to be heated.

As indicated above, several inserts, each having at least one surface heating element, may be held one behind the other in the direction of the longitudinal axis at a common connecting part. For this purpose, the common connecting part can be a connecting rail which has a tongue and groove guide running in the longitudinal direction, to which the respective insert can be connected with a corresponding tongue and groove guide. The rail can then be used to connect several inserts stacked in the longitudinal direction. These stacked inserts are then preferably accommodated in a common outer casing.

For such stacking of several inserts one behind the other, intermeshing parts, such as grooves and projections, can be arranged at the respective adjacent ends to prevent twisting.

To insert an insert, to which the surface heating element is preferably already attached, into the outer casing, an assembly aid is used that has, for example, two rods that engage in the edges of the tubular body, for example in the area of the slot of the insert, in order to press the edges together and thus reduce the diameter of the tubular body; at the same time, the tubular body is pretensioned.

Figure 7A:
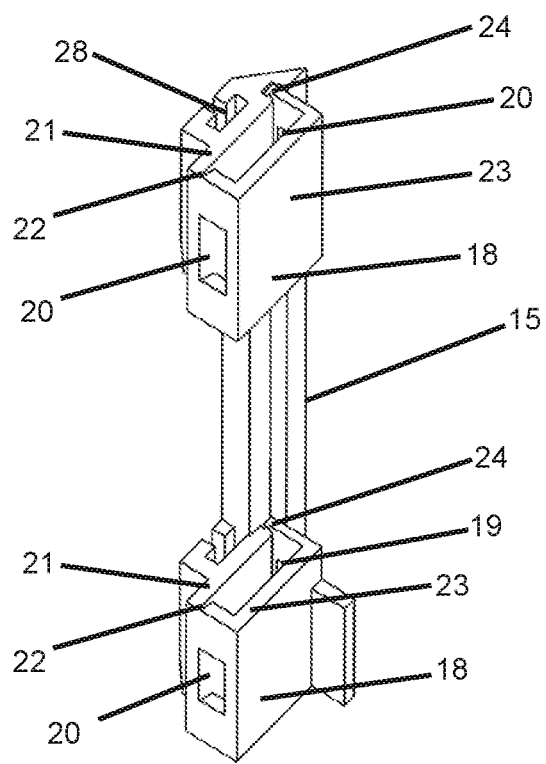

Additional details and features of the invention will become apparent from the following description of exemplary embodiments with reference to the drawing. The drawing shows in FIG. 1 a perspective illustration of the heating device according to the invention according to one embodiment, FIG. 2 a perspective view of an insert as it is inserted in the embodiment of FIG. 1, with rod-shaped auxiliary tools to insert this insert into the outer casing of the heating device of FIG. 1, FIG. 3 the insert of FIG. 2 with a surface heating element held thereon, FIG. 4 a view corresponding to FIG. 3 in which the surface heating element is unwound onto the outer surface of the insert, FIG. 5 the surface heating element as used in FIGS. 1, 3 and 4, FIG. 6 the insert, as illustrated in FIGS. 3 and 4, from a view from the opposite side of the slot, FIG. 7A a rail as used in the embodiments of FIGS. 1 to 4, with upper and lower clamping parts, FIG. 7B the section of a rail showing the design of a middle clamp part, FIG. 7C the rail of FIG. 7B with a surface heating element attached to it, FIG. 8 an insert according to a further embodiment with a V-shaped groove, FIG. 9 a top view of the insert of FIG. 8 seen from the axial direction of the tubular body, to which a surface heating element is attached and unwound on the outside of the insert, FIGS. 10 and 11 each contain a schematic cross-sectional illustration of the two embodiments of the insert, as illustrated in FIGS. 1 to 4 and 6 on the one hand and in FIGS. 8 and 9 on the other, FIGS. 12 to 15 different embodiments of the heating device in cross-section with outer casing, heating element and insert, and FIG. 16 a heating device in which several inserts are held by a common clamping part inserted in a common tubular outer casing.

A heating device according to the invention as illustrated in FIG. 1 and generally designated by the reference sign 1 is used to heat liquids in a reservoir of a vehicle, such as a tank or a container.

The heating device 1 shown comprises a housing 2 resistant to the liquid to be heated with a tubular outer casing 3. This outer casing 3 is closed at one end by a base part 4 and at the other end by a cover part 5 and preferably has a round or oval cross-section to which a longitudinal tube axis 6 can be assigned.

An insert 7 is inserted into the outer casing 3 of housing 2. A surface heating element 8 that is pressed flat against the inside of the outer casing 3 by the insert 7 is located between the outer casing 3 and the insert 7. This surface heating element 8 is supplied with power via connecting conductors 9 that are routed out of the housing 2 sealed through the cover part 5, said power being provided, for example, by the electrical system of a vehicle.

The at least one surface heating element 8 covers at least part of the circumference of the inner surface of the outer casing 3 when viewed in the circumferential direction of the outer casing 3 and is in thermal contact with the inner surface of the outer casing 3. The insert 7 exerts a compressive force on the surface heating element 8 that is generated by an outer sheath or tubular body 10 of the illustrated embodiment.

The jacket 10 of the insert 7 has a slot 11 which runs in the direction of the tube axis 6 of the outer casing 3. This jacket 10 is pretensioned outwards when inserted into the outer casing 3. This means that the insert 7, in a state in which it has not yet been inserted into the jacket 10, has a diameter greater than the inner diameter or inner dimensions of the outer casing 3.

In order to insert this insert 7 into the outer casing 3, the insert 7 or the jacket 10 of insert 7 must therefore be pressed together in the area of slot 11. The jacket or the slotted tubular body 10 can therefore be regarded, relative to its cross-sectional shape, as a section of a coil spring which, however, when viewed in the direction of the tube axis 6 of the outer jacket 3, is dimensioned with a large extension or length.

Figure 2:
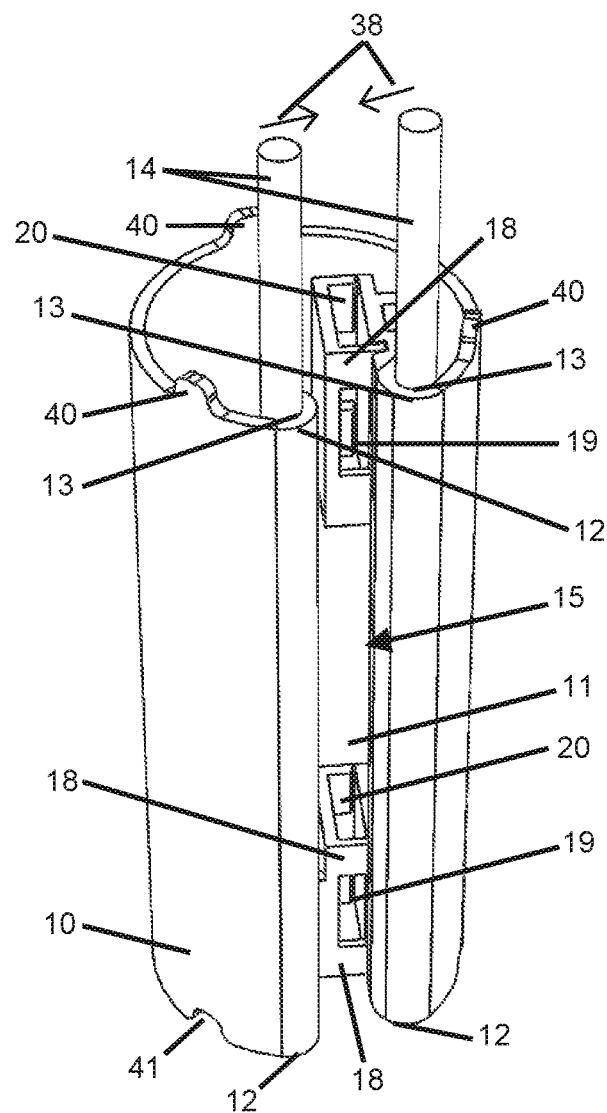
Figure 3:
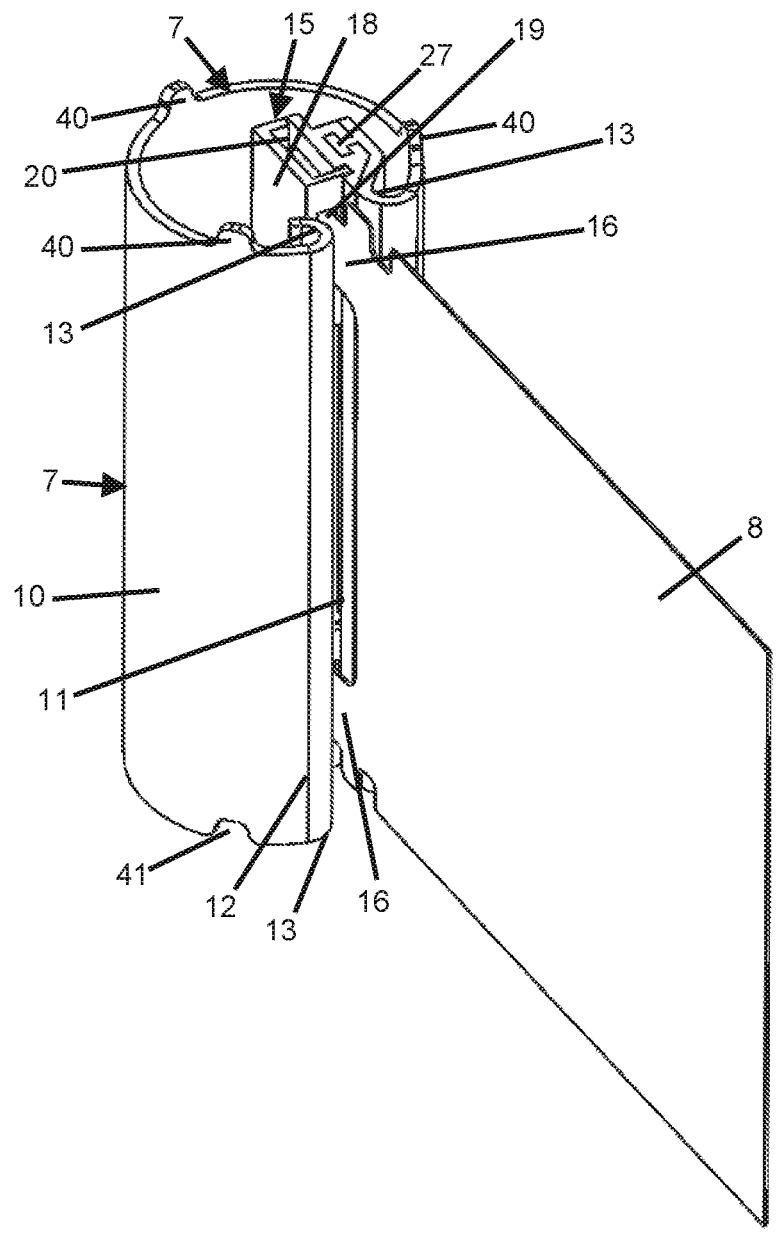
Figure 4:
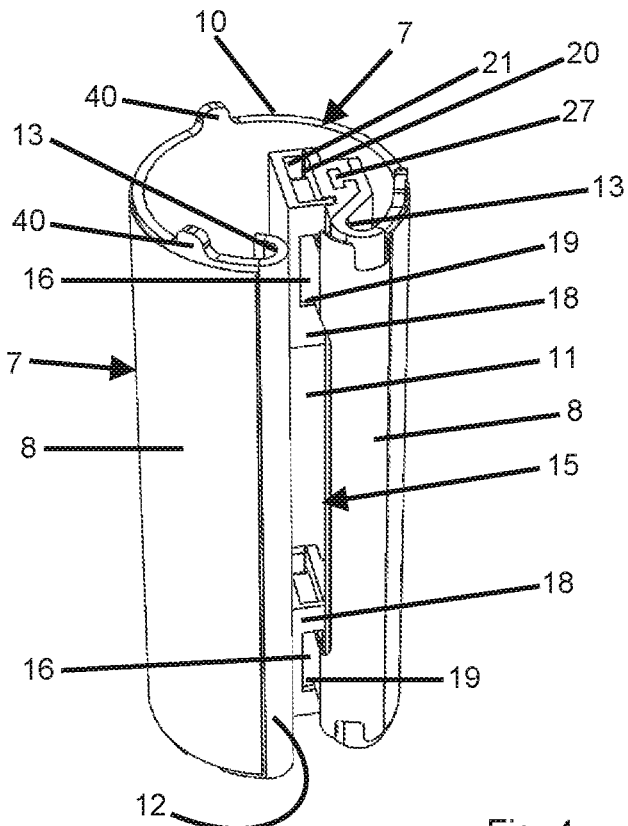

The insert 7 of heating device 1 of FIG. 1, which is shown in FIG. 2 without surface heating element 8 and in FIGS. 3 and 4 with surface heating element 8, is provided in the area of slot 11 at each edge 12 with an inwardly crimped, rolled or inverted rim or longitudinal edge 13. This rim, which is rolled up for example semicircular when viewed from the inside, can be used to employ two rod-shaped auxiliary tools 14, as illustrated in FIG. 2, to compress the jacket 10 of insert 7 in the area of slot 11 with these auxiliary tools, thus reducing the outer diameter of insert 7.

In the area of slot 11, the surface heating element 8 is held preferably by a strip-shaped connecting part 15 attached along one edge 12 of insert 7, as illustrated in FIGS. 1, 3 and 4.

As can be seen from the Figures, the corresponding crimped edge 13 of the jacket 10 of the insert 7 serves to route the surface heating element 8 with a defined radius around the edge 12 delimiting the slot 11 onto the outer surface of the insert 7.

Figure 5:
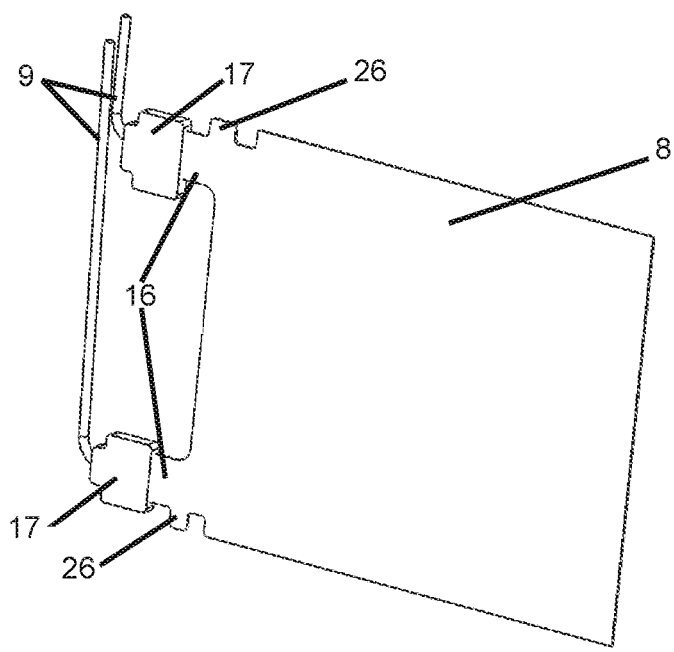
Figure 6:
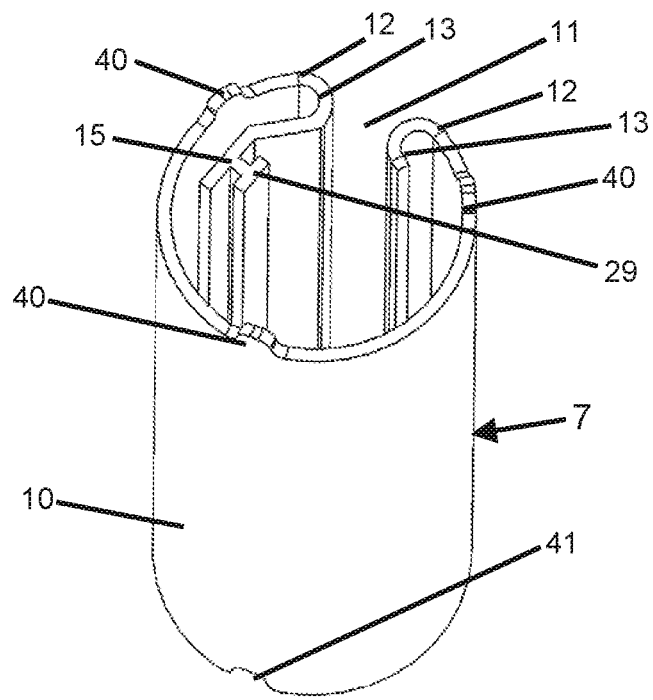

The surface heating element 8, which is shown in more detail in FIG. 5 and is preferably a PTC surface heating element, is very thin. Located on one side edge of the rectangular surface heating element 8 are two tab-shaped extensions, also known as connection tabs 16. The two connecting leads 9 of the surface heating element 8 are attached in the area of these connection tabs 16, whereby the connection points in the area of the connection tabs 16 are additionally covered with a potting compound 17 for strain relief, among other things.

The respective tab 16 of the surface heating element 8 is each connected to a clamping part 18 which is part of the strip-shaped connecting part 15 for fastening the surface heating element 8 to one edge 12 along the slot 11, preferably using the strip-shaped connecting part 15. Such a strip 15 with two clamping parts 18 is shown in more detail in FIG. 7A. For this purpose, the respective tab 16 is inserted into a corresponding opening 19 of the clamping part 18, as illustrated in FIG. 3. In this case, the connecting conductors 9 are routed out of the area of the strip-shaped connecting part 15 via one clamping part 18 and through a further opening 20 opposite the opening 19, as illustrated in FIG. 1.

The clamping part 18 is composed of a base part 21 and a cover-shaped hinged part 23 pivotally connected thereto via a joint 22, so that the cover-shaped hinged part 23 can be opened via the joint 22 in order to connect the connecting tab 16 of the surface heating element 8 to the clamping part 18 and thus to the strip 15, in order then to insert the tab 16 of the surface heating element 8 into the clamping part 18 via the opening 19, for example in the form of a recess. Then the free leg of the hinged part 23 can be connected to the corresponding locking element 25 of the base part 21 via locking elements 24.

Laterally projecting surface parts 26 are located in the area of the tabs 16 on the surface heating element 8 and serve for additional anchoring of the respective tab 16 in the respective clamping part 18.

The strip-shaped connecting part 15 is connected to one rim via a tongue and groove guide 27 running in the longitudinal direction of the insert 7, by pushing the connecting part 15, which in the embodiment shown has the groove 28, in the longitudinal direction onto the tongue 29, which is then assigned to edge 12 or the rolled rim 13. Positioning of the groove 28 on the one hand and the corresponding tongue 29 on the other hand can also be interchanged so that the strip 15 has the tongue 29 and the edge 12 and respectively, the groove 28 is associated with the rolled edge 13. Preferably the part of the tongue and groove guide 27 associated with insert 7, or respectively with the jacket 10 of insert 7, is designed in one part with the jacket 10; however, this part could also be attached to the edge 12 along slot 11 using suitable fastening means.

Figure 7B:
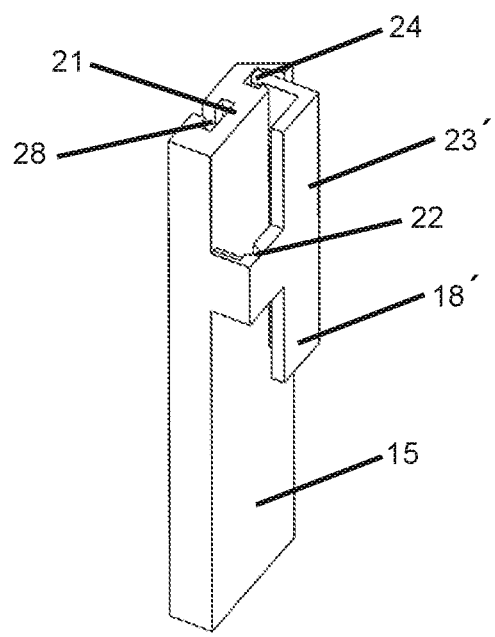
Figure 7C:
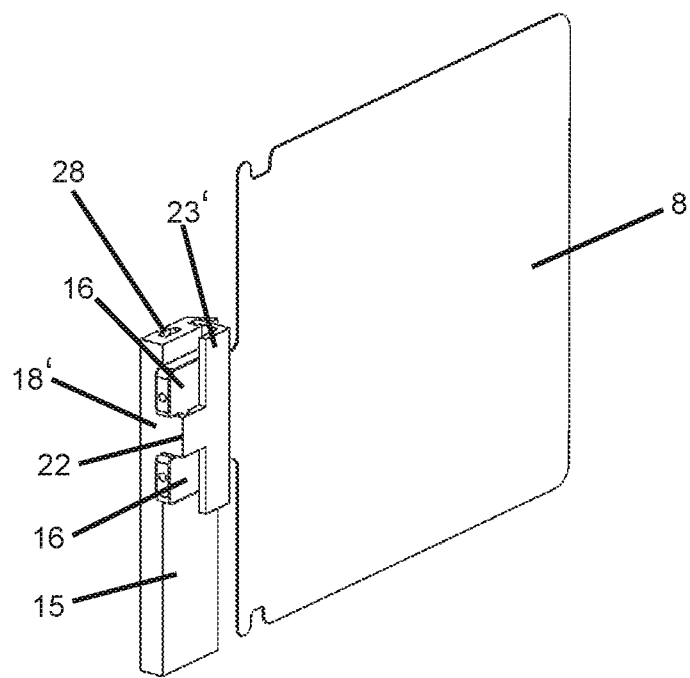

FIGS. 7B and 7C show a further embodiment of a clamping part 18' of strip 15 to which the surface heating element 8 can be attached. For this clamping part 18', the two tab-shaped connecting parts 16, i.e. the connecting tabs as used in the embodiment described above, are positioned at a small distance from each other on the corresponding longitudinal edge of the surface heating element 8. The clamping part 18' also has a hinged part 23' that can be pivoted and that is attached via a joint 22, having a T-shaped contour when viewed from above onto strip 15. While joint 22 is located at the end of one leg, the other two legs each cover one of the two connection tabs 16.

The clamping part 18' can also be arranged, in addition to the clamping parts 18 that are shown and described in the previous Figures, preferably between the clamping parts 18, either as an additional attachment point for the surface heating element 8 or to secure the connecting conductors 9 to the insert 7. Depending on the type of clamping parts 18, 18' used and where they are positioned, the clamping parts 18, 18' and the corresponding tabs 16 and attachment points of the surface heating element 8 are matched to each other.

It is understandable that the connecting conductors 9 do not have to be routed into the interior of the insert 7 via the connection tabs 16, as illustrated in the various embodiments, but can also be arranged elsewhere, although the embodiments shown are preferred.

Figure 8:
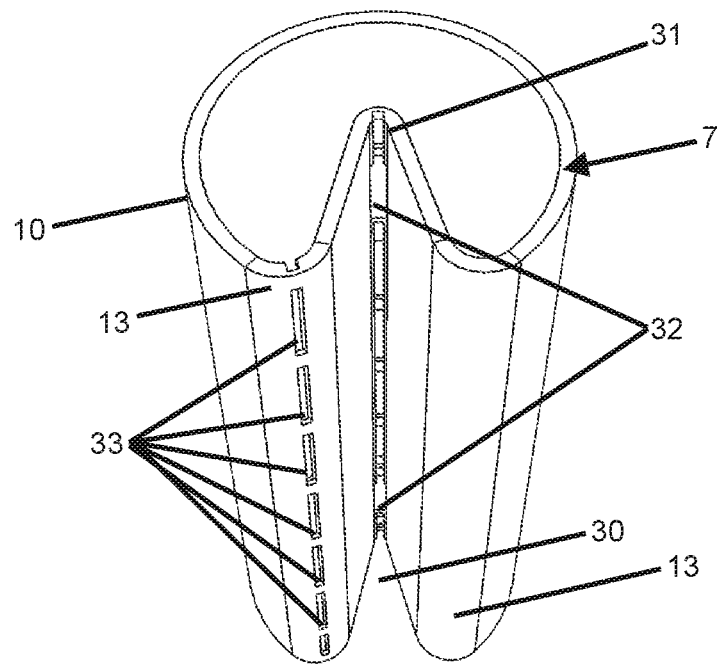
Figure 9:
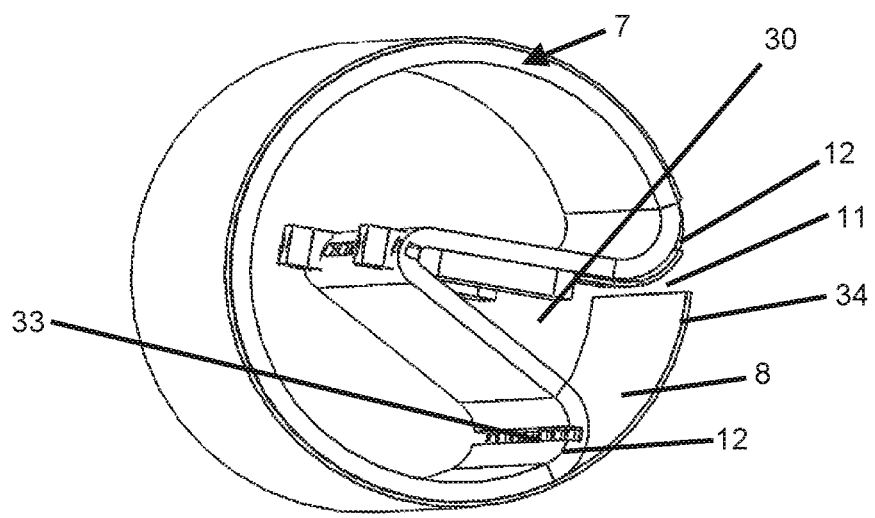

FIGS. 8 and 9 show another embodiment of an insert 7 which, compared to the embodiment of the insert 7 described above, has a V-shaped groove 30 in which the jacket 10 of the insert 7, viewed in the circumferential direction, is extended and thus the jacket 10 is closed. This jacket 10 is also pretensioned such that its outer circumference, or diameter, is larger than the inner circumference, or diameter, of the outer casing 3 of the heating device 1, in which it is inserted to press the surface heating element 8 flat against the inside of the outer casing 3. The V-shaped surface portion of the jacket 10 viewed in cross-section supports the pretension force obtained when the jacket 10 is pressed together to reduce its diameter.

Cutouts 32 are provided in the bottom area 31 of the V-shaped groove 30, through which the connection tabs 16 are routed for attaching the surface heating element 8. The connecting conductors 9 can also be routed through these cutouts 32. Further cutouts 33 can also be positioned in the transition area of the jacket 10 in the V-shaped groove section 30 to reduce the stiffness of the insert 7 and to concentrate the deformation occurring during clamping of the jacket 10 so that the opening angle of the V-shaped groove 30 is reduced in a defined manner.

FIG. 9 shows the insert 7 of FIG. 8 with a surface heating element 8 arranged thereon, viewed from the axial direction of the tubular body to which a surface heating element 8 is attached. According to the embodiment described above, the surface heating element 8 unwinds over one edge 12, which delimits the slot 11 or the V-shaped groove 30, to the outside of the jacket 10. The free end 34 of the surface heating element 8 can then be routed into the V-shaped groove 30 via the other edge 12 that delimits the other side of the V-shaped groove 30 and attached there if necessary.

Figure 10:
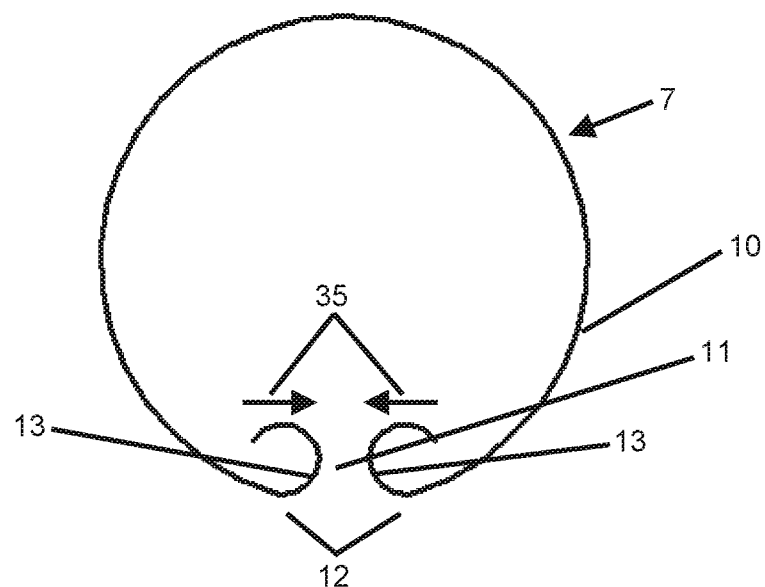
Figure 11:
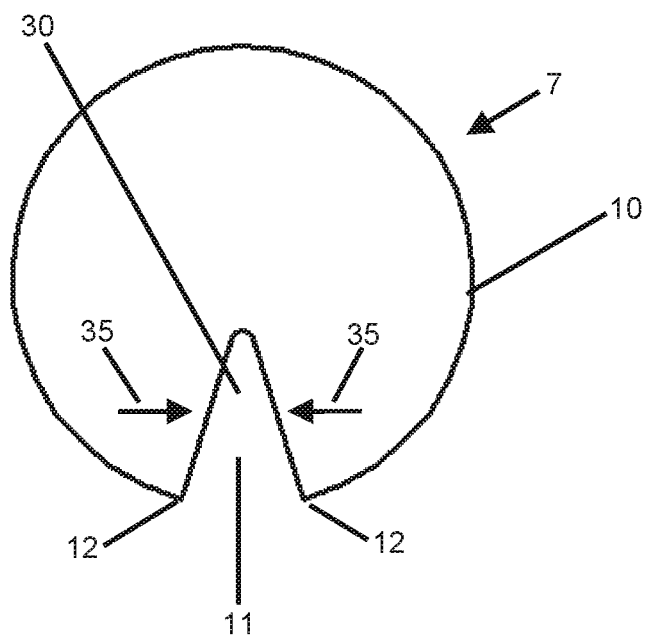

The principle difference between the embodiments of FIGS. 8 and 9 and the previously described embodiments can be seen from the schematic cross-sectional illustrations of FIGS. 10 and 11. Both inserts 7 are based on the fact that in the de-tensioned state they have an outer diameter that is larger than the inner diameter of the outer casing 3 of the housing 2 of the heating device 1. When they are inserted into the outer casing 3, they are pressed together, indicated by the arrows 35, such that the outer diameter of the jacket 10 decreases, so that after insertion into the outer casing 3 and release, the pretensioned jacket 10 expands due to the pretension, thereby pressing the surface heating element 8 against the inner surface of the outer casing 3. In the embodiment of the insert 7, which uses the V-shaped groove 30, the pretensioning force is increased by the V-shaped surface parts and by the fact that the jacket 10 is closed in the area of the slot 11.

The pretension of the insert 7 or its jacket 10 can be set by selecting the material and dimensioning, in particular the material thickness. Preferably, a plastic material with good elastic properties and good temperature stability is used for insert 7. Glass fiber filled PA66 is particularly suitable.

FIGS. 12 to 15 show various further embodiments of the heating device 1 in cross section.

Figure 12:
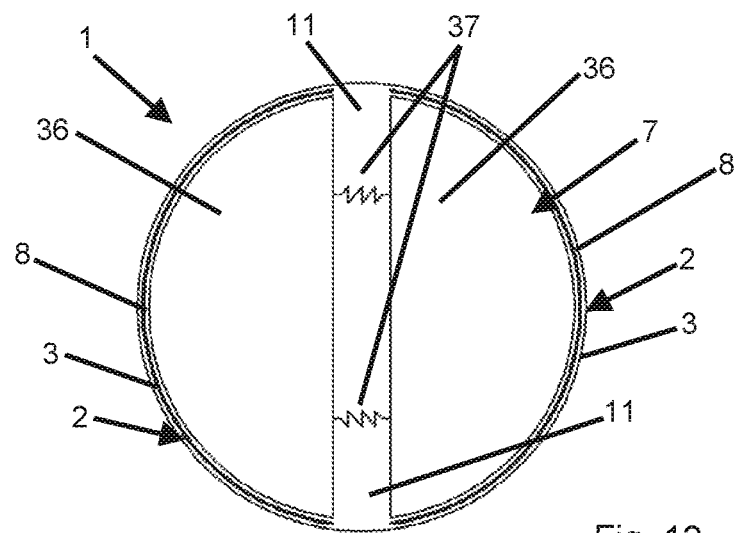

The embodiment, as illustrated in FIG. 12, has an insert 7, which, viewed in cross-section, consists of two semicircular partial bodies 36, the rounded surfaces of which are adapted to the curvature of the inner surface of the outer casing 3, so that they press the surface heating element 8 flat against the inner side of the outer casing 3. Between the two partial bodies 36 there are spring elements 37, for example coil springs, which apply a radially outward force to the two partial bodies 36 so that the respective partial bodies 36 are pressed apart and exert a pressure on the surface heating element 8. FIG. 12 also indicates that in such an embodiment two surface heating elements 8 are used, which are attached in the area of the gap or slot 11 between the two partial bodies 36, in which the spring elements 37 are also arranged. In addition, the connecting conductors 9 can be routed between the two partial bodies 36 in the area of slot 11, although this is not shown in detail.

Figure 13A:
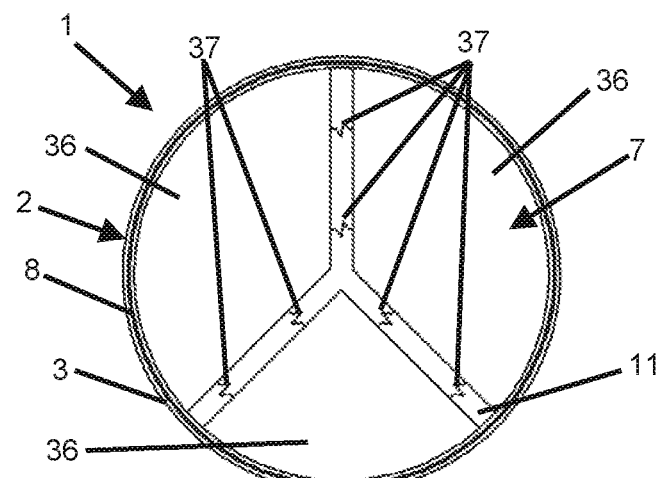
Figure 13B:
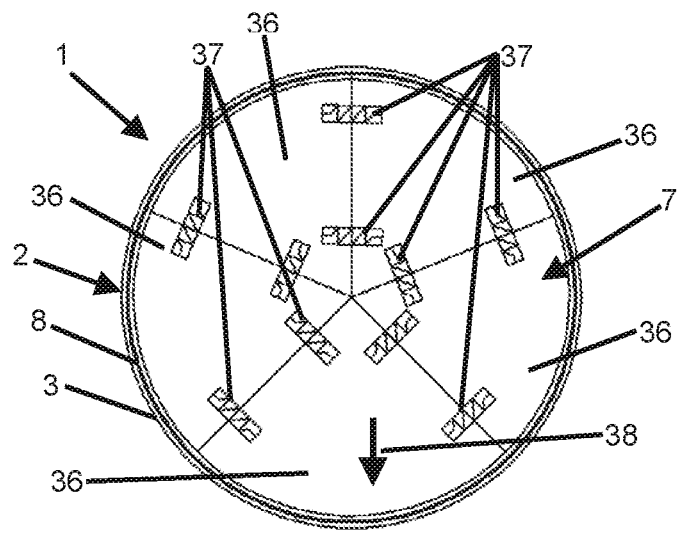

The embodiment of the heating device 1, as illustrated in FIG. 13A in cross-section, as well as the heating device 1, as illustrated in FIG. 13B, is based on the principle previously described based on FIG. 12.

In FIG. 13A, insert 7 is divided into three partial bodies 36, viewed in cross-section. As in FIG. 12, at least one spring element 37 is inserted between the respective adjacent partial bodies 36 in the respective slots 11. These spring elements 37 thus push the partial bodies 36 apart towards the inside of the outer casing 3.

In the embodiment of FIG. 13B, insert 7 is divided into five partial bodies or angular segments 36, viewed in cross-section, so that each partial body occupies an angular segment of about 70°, although the angular segments 36 can also be divided in other ways. Spring elements 37 are inserted between adjacent angular segments 36, for example in corresponding blind holes, which exert a radial outward force on the respective partial body 36, as indicated for example by arrow 38.

Figure 14:
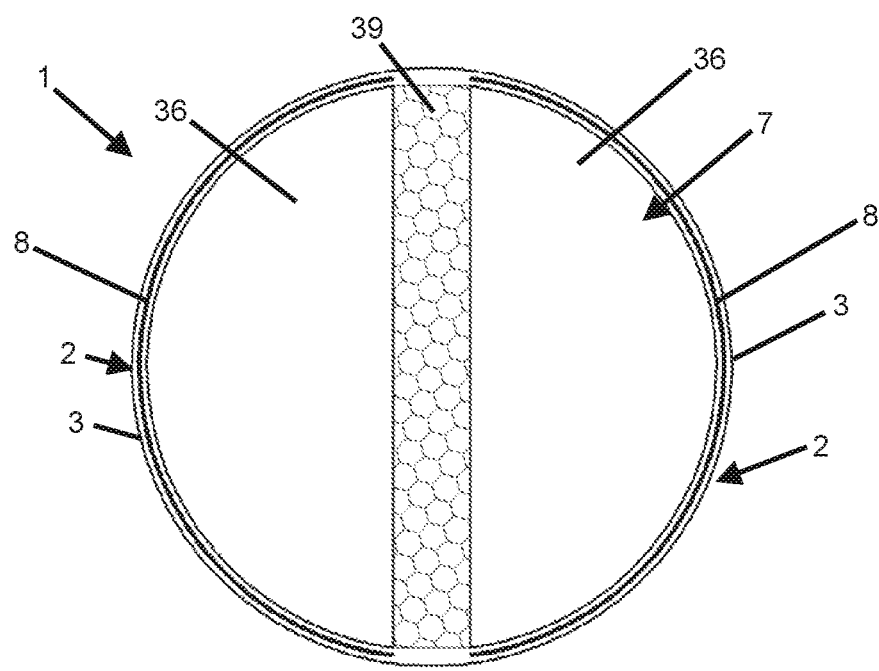

FIG. 14 shows an embodiment of the heating device 1 in cross-section in which, comparable to the embodiment of FIG. 12, two partial bodies 36 are used. However, instead of a coil spring 37, for example, which can be used in the embodiment of FIG. 12, a foam body 39 is inserted as the spring element which, when the insert 7 is inserted into the outer casing 3, is compressed and thus pushes the two partial bodies 36 apart in order to press the surface heating element 8 against the inside of the outer casing 3. Such foam bodies 39 can also be used in the embodiments illustrated in FIGS. 13A and 13B.

Figure 15:
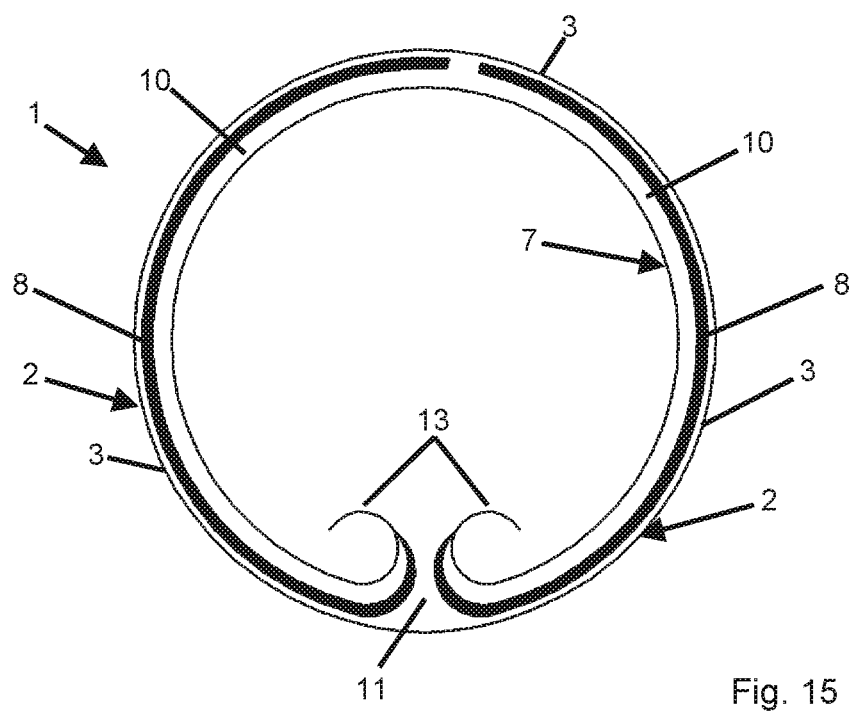

The embodiment of the heating device 1, as illustrated schematically in the cross-section in FIG. 15, is comparable to the one described previously based on FIGS. 1 to 9. However, in this embodiment there are two surface heating elements 8 which are each attached to slot 11 of insert 7 and which, starting from slot 11, surround insert 7 in opposite directions.

Figure 16:
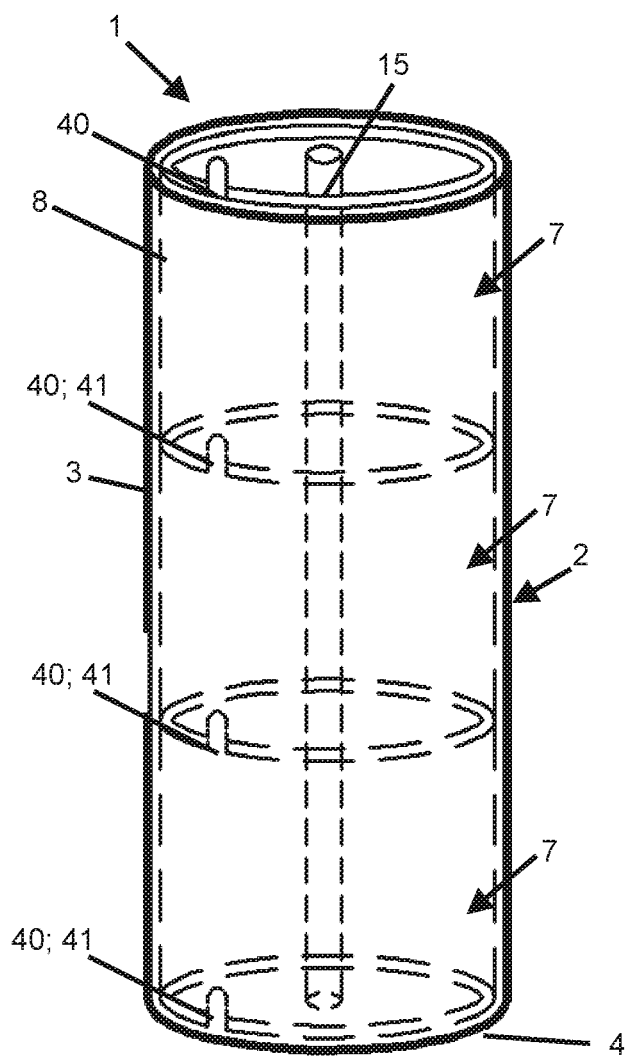

In the embodiment of FIG. 16, several inserts 7 are accommodated in a common outer casing 3, stacked one above the other in the axial direction. If necessary, these Inserts 7 can be connected via a common rail 15, such as the one previously described based on FIGS. 1 to 7. For this purpose, the individual inserts 7 can be held on the common rail 15 via a tongue and groove connection.

The inserts 7 stacked in the longitudinal direction 6 can have intermeshing parts at the respective adjoining ends to prevent twisting, for example projections or tabs 40, which are inserted into correspondingly adapted recesses 41 of the subsequent insert 7. These tabs 40 and recesses 41 are also indicated in the embodiments of insert 7 described above based on FIGS. 2 to 4 and 6.

The heating device according to the invention is characterized by its simple structure and compact design. Only a few components are required, namely the housing 2 with an outer casing 3, base part 4 and cover part 5, the surface heating element 8 and the insert 7. The surface heating element 8 as a heater is a self-supporting component. A PTC surface heating element is self-regulating when energized and thus heats up, and the tank contents are protected from overheating. The spring element or spring elements used to press the surface heating element 8 against the inner surface of the outer casing 3 are mechanical components and practically insensitive to damage. The same applies to a foam element 39, with which parts of the insert 7 are pressed against the surface heating element 8 with the foam element 39 making a frictional connection with the parts against which it rests by its expansion behavior.

It is also provided to use an element instead of the foam element, which expands and cures by phase transformation/crosslinking and thus creates a frictional connection between the parts of the insert 7.

The heating device 1 is dimensioned depending on the container in which it is used to heat a liquid. A cylindrical shape of the outer housing with a preferred diameter of the outer casing 3 from 30 mm to 150 mm is preferred, with a particularly preferred diameter of 40 mm, which is sufficient to provide sufficient space in the interior for the insert 7 and the necessary spring elements, including the jacket 10 of the insert 7. The length of the heating device 1, viewed in the direction of the tube axis 6 of the outer casing 3, is between 30 mm and 300 mm. The outer casing 3 should be made of a corrosion-resistant material, preferably stainless steel or plastic, with a material thickness of 0.5 mm to 3 mm, preferably in the range of 0.5 mm to 1 mm.

The outer casing 3 could also have a conical shape, with a correspondingly matched insert 7. Such a shape is preferred when the outer casing 3 is produced by injection molding.

By means of the clamping device described based on FIG. 2 (auxiliary tool 14), it is possible to insert the insert 7, which serves as a spring and pressure device, into the outer casing 3 without contacting the casing 2 and thus without any risk of damage. This also makes automated assembly possible. The rolled rims 13 of the jacket 10 of the insert 7 are a simple measure to engage there with the auxiliary tool 14. In addition, the rolled rims 13 ensure that a surface heating element 8 attached to the interior of insert 7 can be routed to the outer surface of insert 7 without bending stress.

For rod-shaped auxiliary tools, as illustrated in FIG. 2, a thickening of the jacket 10 could also be provided, in the area of which one or more bores or holes are introduced in which a clamping tool, for example with two mandrels, engages.

The surface heating element 8 can also be glued in the area of slot 11 or the V-shaped groove 30 of insert 7.

The insert 7 or its jacket 10 can be designed such that the slot 11 or the V-shaped groove 30 closes when the insert 7 is inserted into the outer casing 3, so that the edges 12 of the jacket 10, which delimit the slot 11, abut approximately against each other or the surfaces of the V-shaped groove 30 lie approximately against each other.

In the case of the V-shaped groove 30, the pocket resulting from the groove 30 is first opened so that the surface heating element 8 can be inserted and attached. The surface heating element 8 with its feed lines is threaded through two openings into the bottom of the V-shaped groove 30, which can also be U-shaped in cross-section, and thus into the bottom of the pocket in which the corresponding openings are provided. The connection tabs 16 of the surface heating element 8, and thus also the connection area, preferably protrude through the openings at the bottom of the pocket. Tilting is prevented by the surface heating element 8 being held in a defined position in the winding direction (radial direction) and perpendicular to the winding direction (axial direction).

For insertion of insert 7 with the surface heating element 8 attached to it, a uniaxial rolling movement is sufficient to place the surface heating element 8 on the outer surface of insert 7, such that insert 7 with the surface heating element 8 can be inserted into the outer casing 3 of housing 2.

When selecting the material, especially for insert 7, it must be ensured that there is sufficient spring force over the entire service life of the heating device 1 and under the expected temperature load of up to 100° C. to press the surface heating element 8 against the inner surface of the outer casing 3. The radial outward spring force exerted by insert 7 should be 1 N.

High temperature resistant polymers such as PEEK, PA46 Stanyl TW341, PVDF, PI, as well as standard polymers such as PA66 GF, PA12, PC, PET, PP are preferred as materials for insert 7. Additional metal inlays can also be used as reinforcement parts to reinforce the insert 7.

Spring elements can also be strips of spring steel with a width of 5 mm to 15 mm, preferably about 10 mm, and a thickness of 0.1 mm to 0.5 mm, particularly preferred 0.1 mm, which can be inserted, for example, as parts into the wall of the jacket 10 of insert 7, PA66 GF is particularly suitable for the jacket 10 of insert 7 due to its good temperature resistance up to 250° C., if necessary, with additional steel or spring steel inlays.

If spring elements made of a foam material are used, an FKM foam (Viton®) with a temperature resistance of up to 250° C. is preferably used. It is also possible to use a silicone foam with a temperature resistance of up to 280° C.

In a further embodiment, the insert 7, divided into several sections as illustrated in FIGS. 12 to 14, with the surface heating element 8 held therein, can first be inserted into the outer casing 3 and then sprayed into the spaces in which the foam element or the spring elements are located in FIGS. 12 to 14 a liquid phase material which reacts chemically or under heat, expands and presses the surface heating element 8 against the inner surface of the outer casing 3. The foam sets and hardens, thus freezing its shape on the surface heating element 8 while maintaining the contact pressure of the insert 7. Polyurethane spray foam or UF spray foam are preferred for this purpose.

It can be seen that features that are described using only one embodiment can also be used for the other embodiments described without this being expressly mentioned.

The invention claimed is:

1. A heating device for heating liquids in a reservoir of a vehicle, comprising:

a housing, said housing having a tubular outer casing, the tubular outer casing being closed at one end by a base part and at another end by a cover part, an insert inserted into the outer casing of the housing; and at least one surface heating element arranged between the outer casing and the insert, wherein connecting conductors of the at least one surface heating element are routed out of the housing, wherein the at least one surface heating element covers an inner surface of the outer casing viewed in a circumferential direction of the outer casing, at least over a partial circumference with which the outer casing is in thermal contact, and wherein at least a part of the insert is pretensioned and presses the at least one surface heating element against the inner surface of the outer casing at least in partial regions.

2. The heating-device according to claim 1, wherein the at least one surface heating element is held along a slot which extends in an axial direction relative to a tubular axis of the tubular outer casing, and the at least one surface heating element unwinds on an outer surface of the insert starting from the slot.

3. The heating device according to claim 1, wherein the at least one surface heating element is attached to the insert along a slot by at least one clamping part.

4. The heating device according to claim 1, wherein the connecting conductors of the at least one surface heating element are routed in a region of a slot into an inner region of the insert.

5. The heating device according to claim 4, wherein the connecting conductors of the at least one surface heating element are routed in a region of at least one clamping part into the inner region of the insert.

6. The heating device according to claim 5, wherein the at least one clamping part has an opening serving as a feed-through for the connecting conductors into the inner region of the insert.

7. The heating device according to claim 1, wherein the at least one surface heating element has at least one tab-shaped extension by means of which the surface heating element is held on the insert in a region of a slot.

8. The heating device according to claim 7, wherein the connecting conductors are routed via the tab-shaped extension into an inner region of the insert.

9. The heating device according to claim 8, wherein the connecting conductors on the tab-shaped extension are covered by a potting compound.

10. The heating device according to claim 1, wherein the at least one surface heating element, viewed in the circumferential direction, has a length such that no overlapping areas of the surface heating element arise.

11. The heating device according to claim 1, wherein the at least one surface heating element covers approximately the entire circumference of the inner surface of the outer casing.

12. The heating device according to claim 1, wherein the insert has a slotted tubular body which is pretensioned to widen its diameter in a radial direction.

13. The heating device according to claim 12, wherein at least one longitudinal edge of the tubular body is rolled or inverted radially inwards along a slot.

14. The heating device according to claim 13, wherein two longitudinal edges of the tubular body are rolled or inverted radially inwards along the slot.

15. The heating device according to claim 14, wherein the edges of the two rolled-up or inverted edges are connected to one another so that a V-shaped or U-shaped groove is formed when viewed in cross-section.

16. The heating device according to claim 1, wherein the at least one surface heating element comprises two surface heating elements.

17. The heating device according to claim 16, wherein both surface heating elements are attached in a slot of the insert and the two surface heating elements surround the insert in opposite radial directions starting from the slot.

18. The heating device according to claim 1, wherein the at least one surface heating element is attached via a strip along a slot of the insert.

19. The heating device according to claim 1, wherein the insert, viewed in the cross-sectional direction of the outer casing, is subdivided into at least two partial bodies which are pressed apart from one another by spring elements in the radial direction and thus in the direction of the at least one surface heating element.

20. The heating device according to claim 1, wherein the at least one surface heating element is PTC foil heating element.

21. The heating device according to claim 1, further comprising a plurality of inserts, each having at least one additional surface heating element, wherein the plurality of inserts are held stacked one behind the other on a common connecting part in a direction of a longitudinal axis of the tubular outer casing.

22. The heating device according to claim 21, wherein the common connecting part is a connecting rail which has a longitudinally extending tongue and groove guide on which the respective insert can be connected to a corresponding tongue/groove, these stacked inserts being accommodated in the outer casing.

23. The heating device according to claim 21, wherein the inserts stacked in the longitudinal direction have, at respective adjacent ends, parts that intermesh and serve as anti-rotation means.

* * * * *